United States Patent
Kakui et al.

(10) Patent No.: US 6,819,482 B2
(45) Date of Patent: Nov. 16, 2004

(54) OPTICAL AMPLIFIER AND OPTICAL COMMUNICATION SYSTEM INCLUDING THE SAME

(75) Inventors: Motoki Kakui, Yokohama (JP); Masakazu Shigehara, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 15 days.

(21) Appl. No.: 10/292,633

(22) Filed: Nov. 13, 2002

(65) Prior Publication Data

US 2003/0090782 A1 May 15, 2003

(30) Foreign Application Priority Data

Nov. 13, 2001 (JP) .................................... P2001-347797

(51) Int. Cl.[7] .............................................. H01S 3/00
(52) U.S. Cl. ................................... 359/341.5; 359/337
(58) Field of Search .............................. 359/337, 341.5

(56) References Cited

U.S. PATENT DOCUMENTS

| | | | |
|---|---|---|---|
| 5,703,978 A | 12/1997 | DiGiovanni et al. | |
| 6,104,526 A | 8/2000 | Kakui | |
| 6,313,941 B1 | 11/2001 | Suzuki et al. | |
| 6,476,960 B1 * | 11/2002 | Traynor et al. | 359/341.31 |
| 6,496,302 B1 * | 12/2002 | Michishita | 359/337.1 |
| 6,501,596 B1 * | 12/2002 | Inoue et al. | 359/341.5 |
| 6,535,329 B1 * | 3/2003 | Pelard et al. | 359/337 |
| 6,589,895 B2 * | 7/2003 | Dejneka et al. | 501/42 |

FOREIGN PATENT DOCUMENTS

| | | |
|---|---|---|
| JP | 04-11794 | 1/1992 |
| JP | 10-335722 | 12/1998 |
| WO | WO 03/002475 A1 * | 1/2003 |

OTHER PUBLICATIONS

Y. Ishii et al., "Temperature Dependence Compensation on EDFA gain Profile using a Phase–Shifted Long–Period Fiber Grating".

J. Nakagawa et al., "1580–nm Band Erbim–Doped Fiber Amplifier Employing Novel Temperature Compensation Technique".

T. Tsuda et al., "Gain–flattening filters with autonomous temperature stabilization of Erbium gain".

S. Shen et al. "Thulium–doped Tellurite Glasses for S–band Amplification", Optical Fiber Communication Conference. Technical Digest Postconference, Edition, Anaheim, CA, Mar. 17–22, 2001, Trends in Optics and Photonics Ser. vol. 1 of 4, Mar. 17, 2001, pp. TuQ6–1–TuQ6–3.

Ian G. Clarke et al., "S–band Amplifier with Variable Gain Tilt Control", Optical Fiber Communication Conference, Technical Digest Postconference, Edition Anaheim, CA, Mar. 17–22, 2001, Tends in Optics and Photonics Series vol. 54, Washington, WA, vol. 1 of 4, Mar. 17, 2001, pp. TuQ2–1–TuQ2–3.

* cited by examiner

*Primary Examiner*—Mark Hellner
(74) *Attorney, Agent, or Firm*—McDermott Will & Emery LLP

(57) ABSTRACT

The present invention relates to an optical amplifier (TDFA) having a configuration which enables to reduce temperature dependence of the gain with reduced power consumption and simple control. The optical amplifier includes, in the order from an input port to an output port, an optical isolator, an optical coupler, an optical amplification fiber, an optical coupler, an optical isolator, an optical gain equalizing filter, a variable optical attenuator, an optical isolator, an optical coupler, an amplification fiber, an optical coupler, and an optical isolator. At least a core region of the optical amplification fiber is doped with Tm element, and signal light in a predetermined wavelength range is amplified by supply of pumping light. The gain equalizing fiber has a loss spectrum which shifts toward the short wavelength side as the temperature of the optical waveguide is higher, thereby equalizing the optical amplification gain of the signal light in the optical amplification fiber.

16 Claims, 9 Drawing Sheets

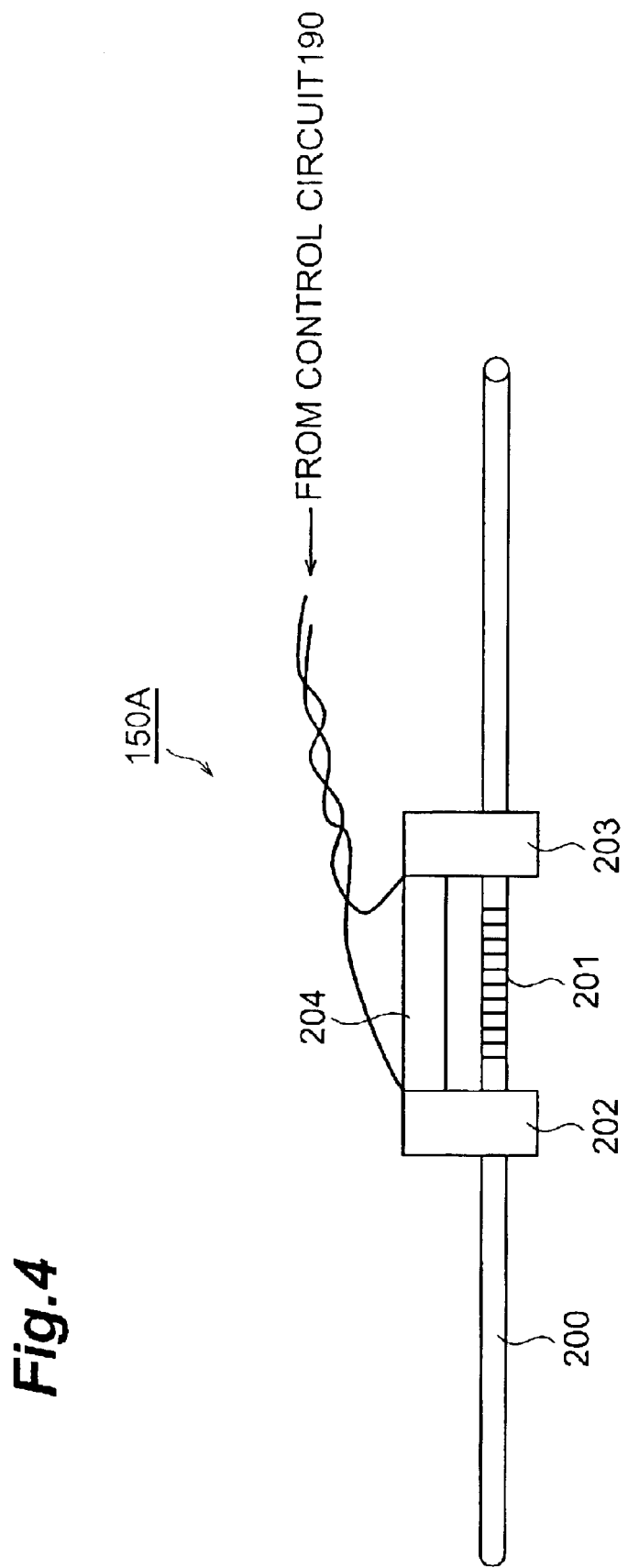

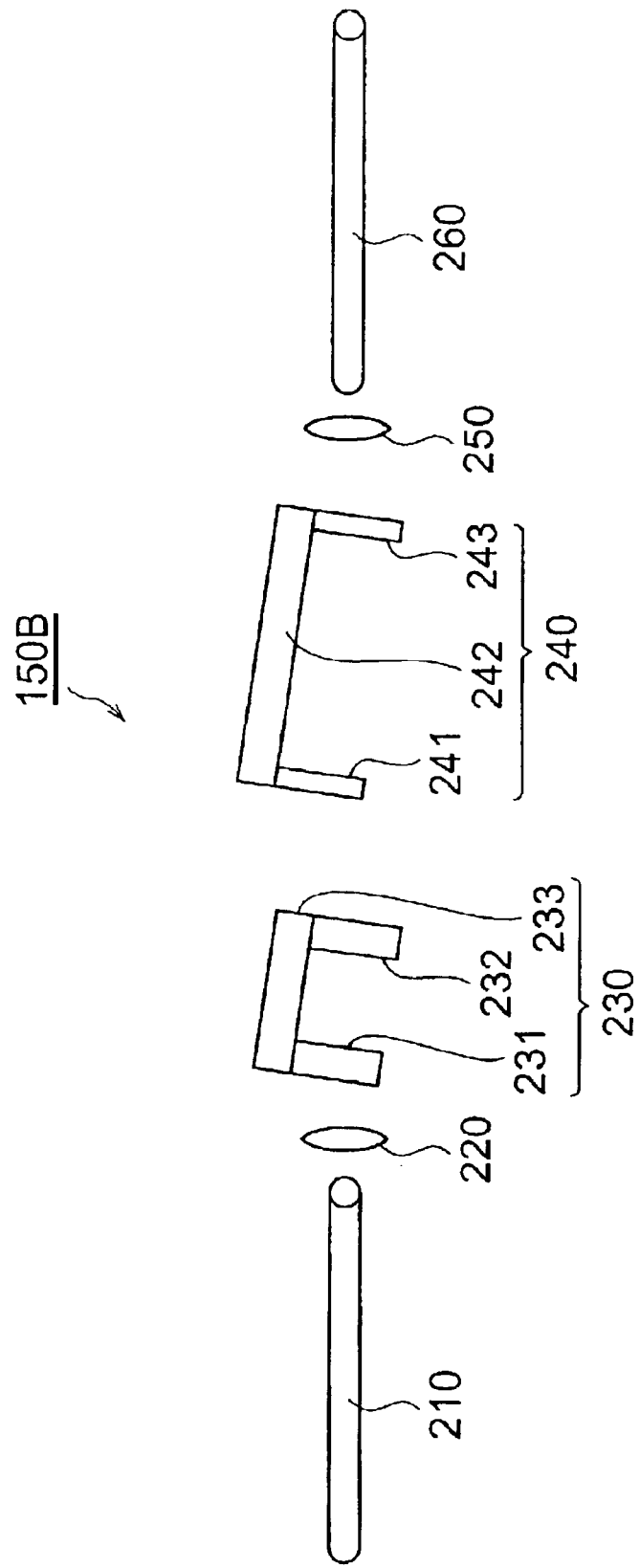

OPTICAL AMPLIFIER AND OPTICAL COMMUNICATION SYSTEM INCLUDING THE SAME

BACKGROUND OF THE INVENTION

1. Field of the Invention

The present invention relates to an optical amplifier which amplifies signal light in an optical waveguide to which pumping light is supplied, and an optical communication system including the optical amplifier.

2. Related Background Art

An optical communication system transmits large-capacity information with a high speed in such a manner that signal light having a plurality of channels of different wavelengths from each other (WDM: Wavelength Division Multiplexing signal light) propagates through an optical fiber transmission line. The C band (1530 nm to 1565 nm) has been already used as a signal wavelength range in the optical communication system, and the use of the L band (1565 nm to 1625 nm) also is considered. Further, in order to develop further large-capacity of information, and the use of the S band (1460 nm to 1530 nm) is considered as a signal wavelength range.

In the optical communication system, an optical amplifier to amplify signal light is applied. As an optical amplifier which enables to amplify the signal light of the C or L band, utilized is an EDFA (Erbium-Doped Fiber Amplifier) in which an optical amplification fiber (EDF: Erbium-Doped fiber) where Er (erbium) element is doped to its optical waveguide region is applied as an optical amplification medium. The EDFA can amplify signal light of the C or L band which propagates through the Er-doped optical fiber by supplying pumping light (0.98 $\mu$m wavelength band or 1.48 $\mu$m wavelength band) to the Er-doped optical fiber.

On the other hand, as an optical amplifier which enables to amplify the signal light of the S band, considered is TDFA (Thulium-Doped Fiber Amplifier) in which an optical amplification fiber (TDF: Thulium-Doped Fiber) where Tm (Thulium) element is doped to its optical waveguide region is applied as an optical amplification medium. The TDFA can amplify the signal light of the S band which propagates through the Tm-doped optical fiber by supplying pumping light (1.05 $\mu$m wavelength band, 1.4 $\mu$m wavelength band, or 1.55 to 1.67 $\mu$m wavelength band) to the Tm-doped optical fiber.

In such an optical amplifier, it is important that its gain spectrum is flattened in the wavelength range of signal light to be amplified irrespective of the temperature change. For example, it is required that the gain of an optical amplifier employed in a land-based optical communication system is flat at least within the range of atmosphere temperature: 0° C. to 65° C. irrespective of the temperature. But, the gain spectrum of the optical amplification medium in the optical amplifier is typically not flat in the signal wavelength range, and the gain spectrum may shift toward a short or long wavelength side depending on the temperature. Therefore, it is required that the optical amplifier includes not only a gain equalizing filter for equalizing the amplification gain of signal light in an optical amplification medium but also a temperature compensator for reducing temperature dependency of the gain.

SUMMARY OF THE INVENTION

The inventors have studied conventional optical communication systems in detail and, and as a result, have found problems as follows.

After studying the aforementioned prior art, The inventor found the following problems. For example, according to a temperature compensator of EDFA disclosed in Japanese Patent Application Laid-Open No. 4-11794, it is intended to reduce temperature dependence of the gain by controlling the temperature of an optical amplification fiber itself by temperature adjusting means such as Peltier element. But, there exits a problem in that the electric power to drive the temperature adjusting means is large.

As another temperature compensator, by controlling the transmission characteristics of a variable optical attenuator, a technique which intends to reduce temperature dependency of the gain is also known. But, there exists a problem in that the controlling is complicated.

Incidentally, any temperature compensator of the optical amplifier known so far has EDFA as an object; however, the one having TDFA as an object is unknown. The present invention is made to solve the foregoing problems. It is therefor an object of the present invention to provide an optical amplifier (TDFA) including a configuration which enables to reduce temperature dependency of the gain with simple control, and an optical communication system including the optical amplifier.

In order to achieve the above-mentioned object, an optical amplifier according to the present invention is adapted for amplification of signal light in a wavelength range of 1455 to 1485 nm, and has an optical waveguide where Tm element is added to its optical waveguide region, a pumping light supply system for supplying pumping light to the optical waveguide, and a gain equalizing filter which is optically connected to the optical waveguide. More specifically, in the optical amplifier according to the present invention, the gain equalizing filter is characterized by having a loss spectrum which shifts toward the short wavelength side as the temperature of the optical waveguide is higher. Incidentally, when said optical waveguide is an optical fiber, at least its core region is included in the optical waveguide region doped with Tm element.

In accordance with the optical amplifier, pumping light is supplied from the pumping light supply system to the optical waveguide where Tm element is added to its optical waveguide region. When signal light of a predetermined wavelength range enters the optical waveguide, the signal light will be amplified in the optical waveguide. The loss spectrum of the gain equalizing filter which is optically connected to the optical waveguide has almost the same form as the gain spectrum of the optical waveguide. The amplification gain of the signal light in the optical waveguide is equalized by the gain equalizing filter, and the gain spectrum of the entire optical amplifier becomes flat in a predetermined wavelength range. The gain spectrum of the optical waveguide doped with Tm shifts toward the short wavelength side as the temperature of the optical waveguide of the optical waveguide is higher. On the other hand, the gain equalizing filter has a loss spectrum which will shift toward the short wavelength side as the temperature is higher. Therefore, the temperature dependence of the gain in the entire optical amplifier will be reduced in a predetermined wavelength range. In such away, the optical amplifier can reduce its power consumption and further reduce temperature dependence of the gain with simple control.

In addition, in the optical waveguide according to the present invention, the pumping light supply system may supply light of 1.05 $\mu$m wavelength band only as the pumping light. At the time, the temperature coefficient of wavelength-shifting in the loss spectrum of the gain equalizing filter is preferably −0.02 nm/° C. The is because Tm element added to the optical waveguide region of the optical waveguide is subjected to up-conversion pumping by the pumping light of 1.05 μm wavelength and, while the temperature coefficient of wavelength-shifting in the gain spectrum of the optical waveguide is −0.02 nm/° C. Therefore, the temperature coefficient of wavelength-shifting in the loss spectrum of the gain equalizing filter is −0.02 nm/° C.; as a result, the temperature dependence of the gain in the entire optical amplifier is reduced.

In addition, in the optical amplifier according to the present invention, the pumping light supply system may supply light of 1.05 μm wavelength band and 1.55 to 1.65 μm wavelength band to the optical waveguide as the pumping light. In this case, the temperature coefficient of wavelength-shifting in the loss spectrum of the gain equalizing filter is preferably less than −0.02 nm/° C. The is because the Tm element added to the optical waveguide is pumped by the pumping light of 1.05 μm wavelength band and 1.55 to 1.65 μm wavelength band, while the gain spectrum of the optical waveguide will shift toward the long wavelength side by the pumping light of 1.55 to 1.65 μm wavelength band. Here, the temperature coefficient of wavelength-shifting in the gain spectrum of the optical waveguide becomes less than −0.02 nm/° C. Therefore, the temperature coefficient of wavelength-shifting in the loss spectrum of the gain equalizing filter is −0.02 nm/° C.; as a result, temperature dependence of the gain in the entire optical amplifier is reduced.

The optical amplifier according to the present invention may further include a control circuit for controlling wavelength-shifting in the loss spectrum of the gain equalizing filter. In this case, the loss spectrum of the gain equalizing filter is easily controlled when a stress or thermal energy, for instance, is applied thereto from the external.

Further, in the optical amplifier according to the present invention, the loss spectrum of the gain equalizing filter may be automatically wavelength-shifted without applying a control to the gain equalizing filter from the external. In this case, the loss spectrum is automatically wavelength-shifted without applying an electrical control, for instance, to the gain equalizing filter from the external, resulting in reduced power consumption.

The optical amplifier according to the present invention further includes a variable optical attenuator which is optically connected to the optical waveguide. The attenuation of the variable optical attenuator to signal light is variable in accordance with a temperature change. In this case, not only the gain spectrum of the entire optical amplifier in a predetermined wavelength range becomes flat irrespective of the temperature, but also the gain level thereof becomes constant.

An optical communication system according to the present invention includes an optical amplifier (optical amplifier according to the present invention) having the aforementioned configuration, and transmits the signal light while amplifying the multiplexed signal light (WDM signal light) propagating through a predetermined repeated section. According to the optical communication system, the signal light of a predetermined wavelength range (1455 to 1485 nm) will be amplified by means of the above optical amplifier. Therefore, a high transmittance-quality to signal light of a predetermined wavelength range will be ensured.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4 is a view showing a first configuration example of a gain equalizing filter 150;

FIG. 8 is a view showing a second configuration example of the gain equalizing filter;

DETAILED DESCRIPTION OF THE PREFERRED EMBODIMENTS

In the following, embodiments of an optical amplifier and an optical communication system in accordance with the present invention will be explained in detail with reference to FIGS. 1A, 1B, 2-4, 5A-7C, and 8-11. In the explanation of the drawings, constituents identical to each other will be referred to with numerals identical to each other without repeating their overlapping descriptions.

Figure 1:
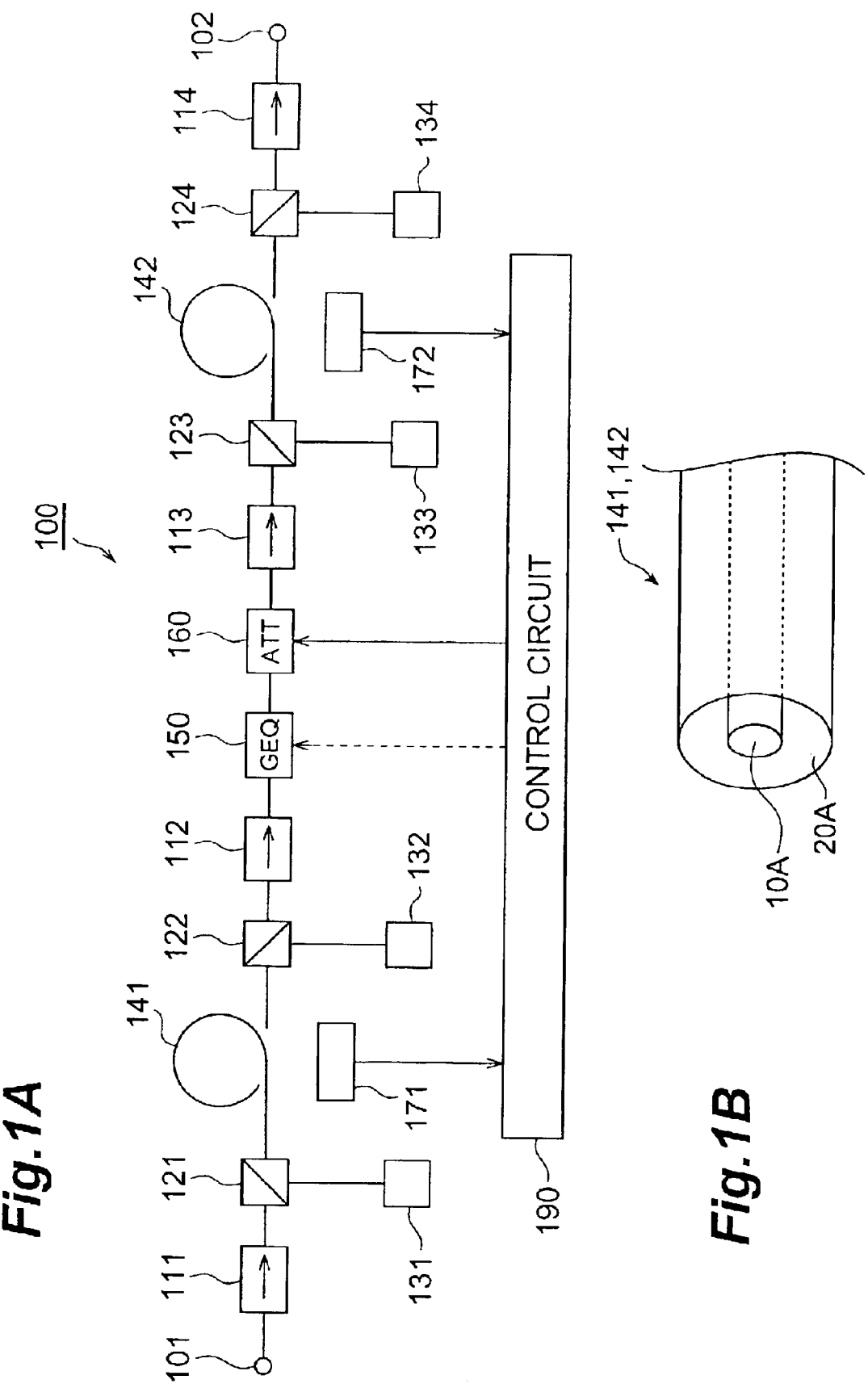
FIG. 1A is a view showing a configuration of an embodiment in an optical amplifier according to the present invention.
FIG. 1B is a view showing a configuration of an optical amplification fiber applied to the optical amplifier shown in FIG. 1A.

FIG. 1A is a view showing a configuration of an embodiment in an optical amplifier according to the present invention. In FIG. 1A, an optical amplifier 100 comprises an optical isolator 111, an optical coupler 121, an optical amplification fiber 141, an optical coupler 122, an optical isolator 112, a gain equalizing filter 150, a variable optical attenuator 160, an optical isolator 113, an optical coupler 123, an optical amplification fiber 142, an optical coupler 124 and an optical isolator 114, which are disposed in the order from an input port 101 to an output port 102. In addition, the optical amplifier 100 further comprises a pumping light source 131 connected to the optical coupler 121, a pumping light source 132 connected to the optical coupler 122, a pumping light source 133 connected to the optical coupler 123, a pumping light source 134 connected to the optical coupler 124, and a control circuit 190.

The optical amplification fibers 141, 142 each, as shown in FIG. 1B, comprise a core region 10A extending along a predetermined axis, and a cladding region 20A provided on the outer periphery of the core region 10A, and is an optical waveguide which uses fluoride-based glass or tellurite-based glass as a host glass. Additionally, these optical amplification fiber 141, 142 are doped with Tm element at least in the core region 10A (included in the optical waveguide region). The optical amplification fibers 141, 142 each amplify signal light of a predetermined wavelength range (1455 to 1485 nm) by supplying the pumping light.

The optical couplers 121, 122 and pumping light sources 131, 132 function as a pumping light supply system. Also, the optical couplers 123, 124 and pumping light sources 133, 134 function as a pumping light supply system which supplies the pumping light to the optical amplification fiber 142. For example, a semiconductor laser pumping such as Nd: YLF laser light source, Nd; YAG laser light source, or Yb laser light source, for instance, is applicable to the pumping light sources 131 to 134.

The pumping light sources 131 to 134 each output pumping light of 1.05 $\mu$m wavelength band, 1.4 $\mu$m wavelength band, or 1.55 to 1.65 $\mu$m wavelength band. The optical coupler 121 supplies the pumping light output from the pumping light source 131 to the optical amplification fiber 141 in the following direction, and outputs the signal light passing through the optical isolator 111 toward the optical amplification fiber 141. The optical coupler 122 supplies the pumping light output from the pumping light source 132 to the optical amplification fiber 141 in the opposite direction, and outputs the signal light passing through the optical amplification fiber 141 toward the optical isolator 112. The optical coupler 123 supplies the pumping light output from the pumping light source 133 to the optical amplification fiber 142 in the following direction, and outputs the signal light passing through the optical isolator 113 toward the optical amplification fiber 142. Also, the optical coupler 124 supplies the pumping light output from the pumping light source 134 to the optical amplification fiber 142 in the opposite direction, and outputs the signal light passing through the optical amplification fiber 142 toward the optical isolator 114.

The optical isolators 111 to 114 each pass the light in the following direction (the direction from the input port 101 to the output port 102) without passing the light in the opposite direction (the direction from the output port 102 to the input port 101). The gain equalizing filter 150 has a loss spectrum which shifts toward the short wavelength side as the temperature is higher, and equalizes the amplification gain of the signal light in the optical amplification fibers 141, 142. The attenuation of the variable optical attenuator 160 to the signal light varies depending on the temperature.

A thermometer 171 measures the temperature of the optical amplification fiber 141 or its vicinity. A thermometer 172 measures the temperature of the optical amplification fiber 142 or its vicinity. The control circuit 190 controls the power of the pumping light output from the pumping light sources 131 to 134 each, and based on the temperatures measured by the thermometers 171, 172, it controls the attenuation to the signal light in the variable optical attenuator 160, and further wavelength-shift controls the loss spectrum of the gain equalizing filter 150 if necessary.

The optical amplifier 101 operates as follows. The pumping light output from the pumping light source 131 is fed to the optical amplification fiber 141 through the optical coupler 121 in the following direction. The pumping light output from the pumping light source 133 is fed to the optical amplification fiber 142 through the optical coupler 123 in the following direction. Also, the pumping light output from the pumping light source 134 is supplied to the optical amplification fiber 142 through the coupler 124 in the opposite direction.

Then, the signal light input from the input port 101 passes the optical isolator 111 and the optical coupler 121 in the order, and then reaches the optical amplification fiber 141. The signal light arrived at the optical amplification fiber 141 is amplified in accordance with the gain spectrum of the optical amplification fiber 141. The signal light (amplified signal light) output from the optical amplification fiber 141 passes the optical coupler 122 and the optical isolator 112 in this order, and reaches the gain equalizing filter 150. The signal light arrived at the gain equalizing filter 150 suffers a loss corresponding to the loss spectrum of the gain equalizing filter 150. The signal light output from the gain equalizing filter 150 reaches the variable optical attenuator 160 and further suffers a loss in the variable optical attenuator 160. The signal light output from the variable optical attenuator 160 passes the optical isolator 113 and optical coupler 123 in this order, and reaches the optical amplification fiber 142. The signal light arrived at the optical fiber amplification fiber 142 is amplified in accordance with the gain spectrum of the optical amplification fiber 142. The signal light output from the optical amplification fiber 142 passes the optical coupler 124 and optical isolator 114 in this order, and is outputted from the output port 102.

The gain spectrum to the signal light of the entire optical amplifier 100 reaching from the input port 101 to the output port 102 is obtained by synthesizing the gain spectra of the optical amplification fibers 141, 142, the loss spectrum of the gain equalizing filter 150, the loss spectrum of the variable optical attenuator, and the loss in other components.

Figure 2:
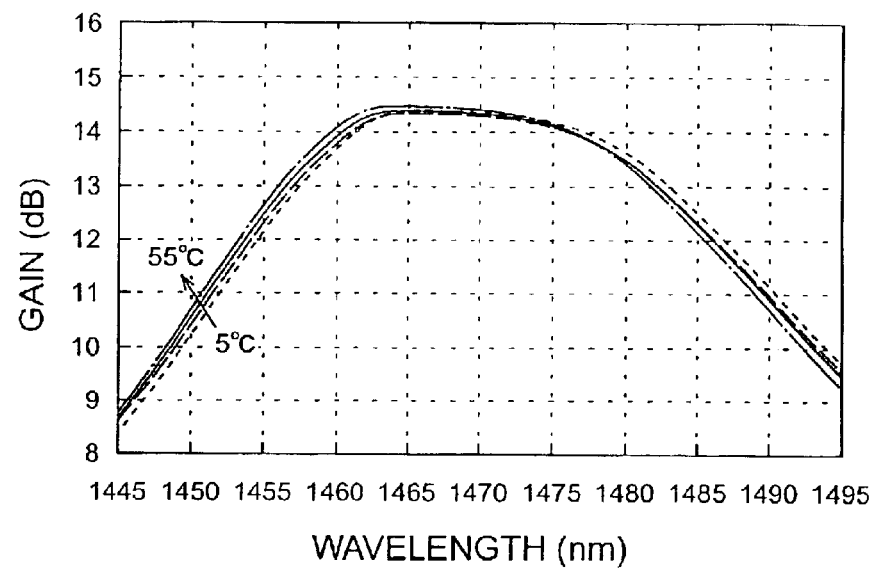
FIG. 2 shows each gain spectrum (pumping by only the pumping light of 1.05 μm wavelength band) at the temperatures of 5° C., 25° C., 45° C. and 55° C. in an optical amplification fiber where Tm element is added to its core region.

FIG. 2 is a gain spectrum of an optical amplification fiber where Tm element is added to its core region. The gain spectrum shown in FIG. 2 is the one where an optical amplification fiber having a Tm content of 2000 ppm and having 20 m in lengthe subjected to up-conversion pumping by the pumping light of 1.05 $\mu$m wavelength band at each condition of temperatures: 5° C., 25° C., 45° C., and 55° C.

As shown in FIG. 2, the gain spectrum in each temperature exhibits almost the same configuration even if these temperatures are different from each other. But, if the temperature is raised, the gain spectrum will shift toward the short wavelength side. The temperature coefficient of wavelength-shifting of the gain spectrum is approximately −0.02 nm/° C. That is, when the temperature is raised by 1° C., the gain spectrum of the optical amplification fiber will shift toward the short wavelength side by 0.02 nm.

Figure 3:
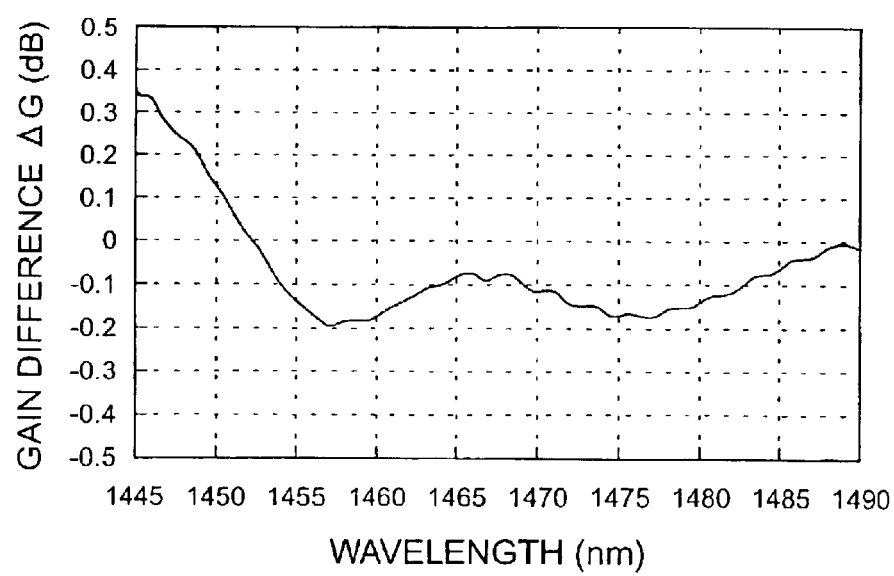
FIG. 3 is a graph showing a gain difference ΔG between the gain spectra shown in FIG. 2.

FIG. 3 is a graph showing the gain spectrum difference (gain difference) ΔG of the optical amplification fiber where Tm element is added to its core region. Here, the gain spectrum difference ΔG (λ) is obtained by subtracting the one shifting the gain spectrum $G_5$ (λ) at the temperature of 5° C. in FIG. 2 toward the short wavelength side by 1 nm, from the gain spectrum $G_{55}$ (λ) at the temperature of 55° C. in FIG. 2. It is represented by the following expression (1):

$$\Delta G(\lambda) = G_{55}(\lambda) - G_5(\lambda + 1 \text{ nm}) \quad (1)$$

where λ is the wavelength.

As shown in FIG. 3, in the wavelength range of 1455 to 1485 nm, the maximum value of absolute value of the gain spectrum difference ΔG (λ) is about 0.2 dB. The change amount of gain deviation per unit temperature change is controlled in about ±0.001 dB/° C. The amount of change of average gain level per unit temperature change is about −0.03 dB/° C. Thus, the gain spectrum $G_{55}$ (λ) at the temperature of 55° C., and $G_5$ (λ+1 nm) obtained by shifting the gain spectrum $G_5$ (λ) at the temperature of 5 toward the short wavelength side by 1 nm almost conforms with each other. That is, when the temperature of the optical amplification fiber is raised by 50° C., the gain spectrum of the optical amplification fiber is shifted by 1 nm toward the short wavelength side. Thus, the temperature coefficient of wavelength-shifting in the loss spectrum of the optical amplification fiber is −0.02 nm/° C. (=−1 nm/50° C.).

Therefore, in the optical amplifier 100 shown in FIG. 1A, when only the light of 1.05 μm wavelength band is supplied as pumping light to the optical amplification fibers 141, 142 from the pumping light sources 131 to 134, the temperature coefficient of wavelength-shifting of the loss spectrum of the gain equalizing filter 150 is preferably set to about −0.02 nm/° C. That is, when the temperature is changed by ΔT (°C.), the gain spectra of the optical amplification fibers 141, 142 are wavelength-shifted by −0.02·ΔT (nm), and the loss spectrum of the gain equalizing filter 150 is also wavelength-shifted by −0.02·ΔT (nm). Accordingly, the gain spectrum of the entire optical amplifier 100 becomes flat irrespective of the temperature.

Such a gain equalizing filter 150 can be performed as follows, for instance. FIG. 4 is a view showing a first configuration example of the gain equalizing filter 150. A gain equalizing filter 150A shown in FIG. 4 includes a long-period grating device 201 where a refractive index modulation with a period of several hundreds μm is formed in its core region along the longitudinal direction of a silica-based optical fiber 200, clamp portions 202 and 203 which holds the two ends of the long-period grating device 201, and a piezo-element 204 provided between the clamp portion 202 and the clamp portion 203. The long-period grating device 201 has a loss spectrum has the same form as the gain spectra of the optical amplification fibers 141, 142. Here, the long-period grating device 201 is preferably the one where a refractive index modulation having a different period is formed in a different region in the longitudinal direction. With such a configuration, the loss spectrum of the same form as the gain spectra of the optical amplification fibers 141, 142 can be obtained.

Here, as explicitly indicated in U.S. Pat. No. 5,703,978 as well, the above-mentioned long-period grating is a grating which induces coupling (mode coupling) between core mode light and cladding mode light which propagate through an optical waveguide such as optical fiber, and is clearly distinguishable from a short-period grating which reflects a light component having a predetermined wavelength. Also, for yielding a strong power conversion from the core mode to the cladding mode, the grating period (pitch) in the long-period grating is set such that the optical path difference between the core mode light and the cladding mode light becomes 2 π. Thus, since the long-period grating acts to couple the core mode to the cladding mode, the core mode attenuates over a narrow band centered at a predetermined wavelength (hereinafter referred to as loss wavelength).

The piezo-element 204 of the gain equalizing filter 150A is controlled by the control circuit 190 based on the temperatures measured by the thermometers 171, 172. That is, the higher the temperature, a tensile stress provided in the long-period grating device 201 is smaller by an action of the piezo-element 204, thereby shortening the period of the refractive index modulation in the long-period grating device 201. As a result, the loss spectrum of the long-period grating device 201 will shift toward the short wavelength side. In this case, since the control circuit 190 may only control the piezo-element 204 in accordance with the temperature change, resulting in reduced power consumption and easy control.

In addition, in the gain equalizing filter 150A shown in FIG. 4, a member made of a material having a negative line expansion coefficient of an appropriate value may be provided instead of the piezo-element 204. The higher the temperature, a tensile stress provided in the long-period grating device 201 is smaller by an action of the member made of the material having a negative line expansion coefficient, thereby shortening the period of the refractive index modulation in the long-period grating device 201. In this case, also, the loss spectrum of the long-period grating device 201 will shift toward the short wavelength side. The loss spectrum will automatically sift without electronic control applied to the gain equalizing filter 150, resulting in reduced power consumption.

Further, the gain equalizing filter 150 can be performed by a long-period grating device which is formed in a silica-based optical fiber whose core and cladding regions are adjusted appropriately in the respective compositions. That is, in the long-period grating device, as the temperature changes, the refractive index changes and further the period of the refractive index modulation changes. As a result, the loss spectrum also changes. Therefore, when the dopant and its doping amount in the core and cladding are appropriately adjusted, the temperature coefficient of wavelength-shifting in the loss spectrum of the long-period grating device can be set to a desired value (−0.02 nm/° C.). In particular, as a large/small relationship of the temperature dependence of the refractive index, the following relationship is specified.

$$GeO_2 > SiO_2 > O > F\text{---}SiO_2 > B_2O_5$$

Therefore, for instance, a refractive index modulation is formed in an optical fiber in which an appropriate amount of Ge and B are commonly added to its core region, and then a long-period grating device whose temperature coefficient of wavelength-shifting in the loss spectrum has a desired value can be fabricated. Such an example is shown in FIGS. 5A to 7C.

Figure 5A:
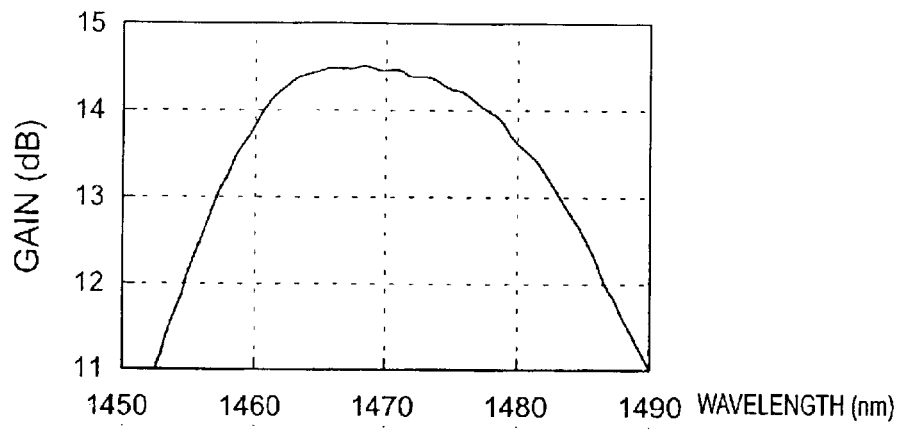
FIGS. 5A to 5C show the gain spectrum of an optical amplification fiber at the temperature of 5° C., the transmission spectrum of a long-period grating device as a gain equalizing filter; and the gain spectrum of the entire optical amplifier.
Figure 5B:
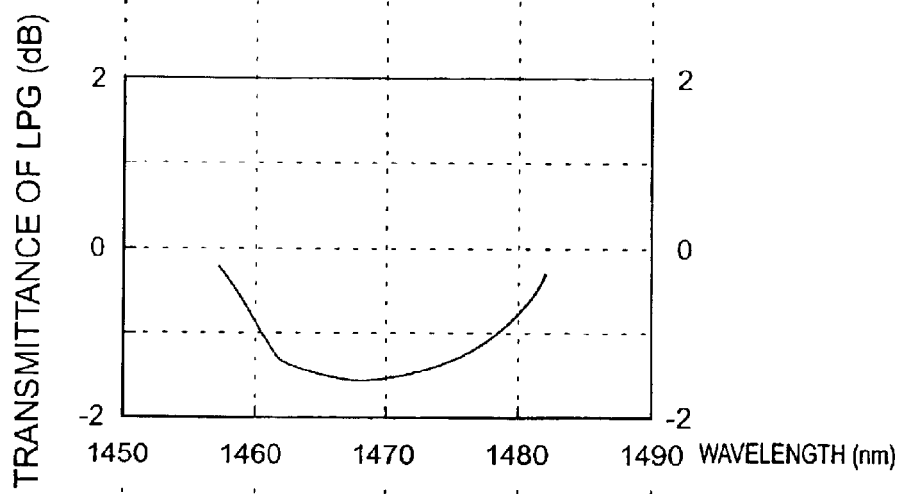
Figure 5C:
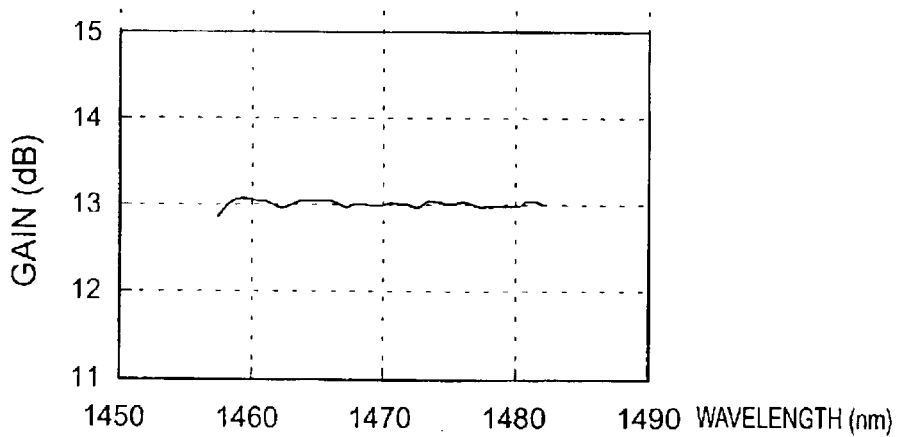
Figure 6A:
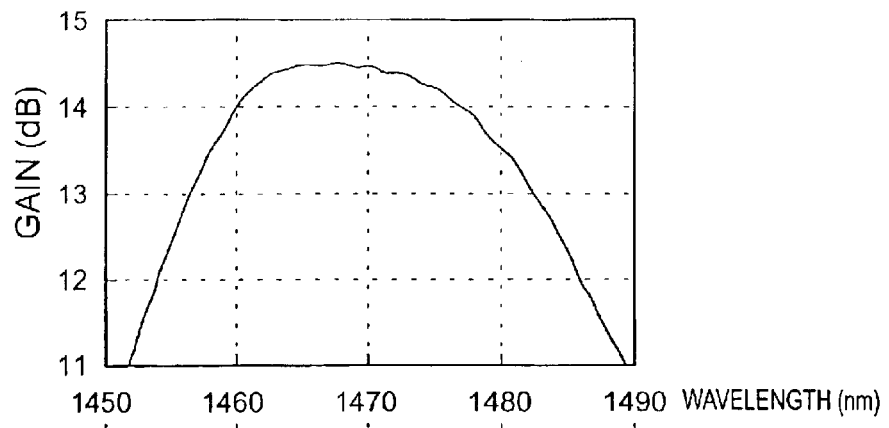
FIGS. 6A to 6C show the gain spectrum of an optical amplification fiber at the temperature of 25° C., the transmission spectrum of a long-period grating device as again equalizing filter; and the gain spectrum of the entire optical amplifier.
Figure 6B:
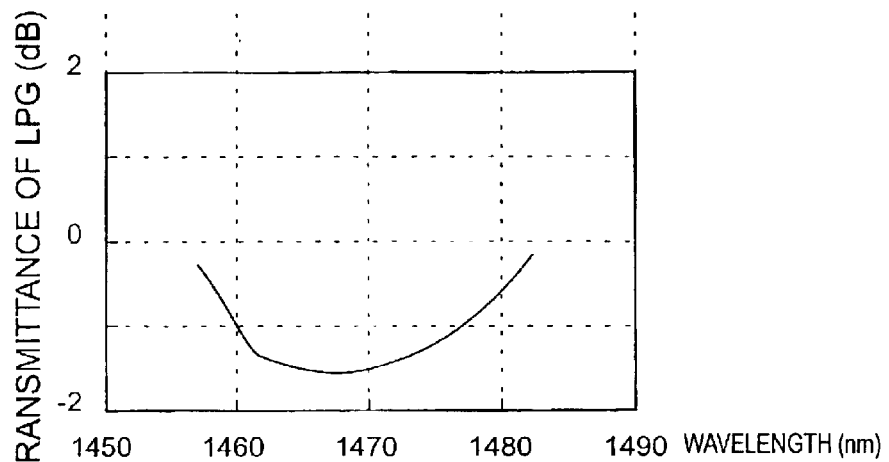
Figure 6C:
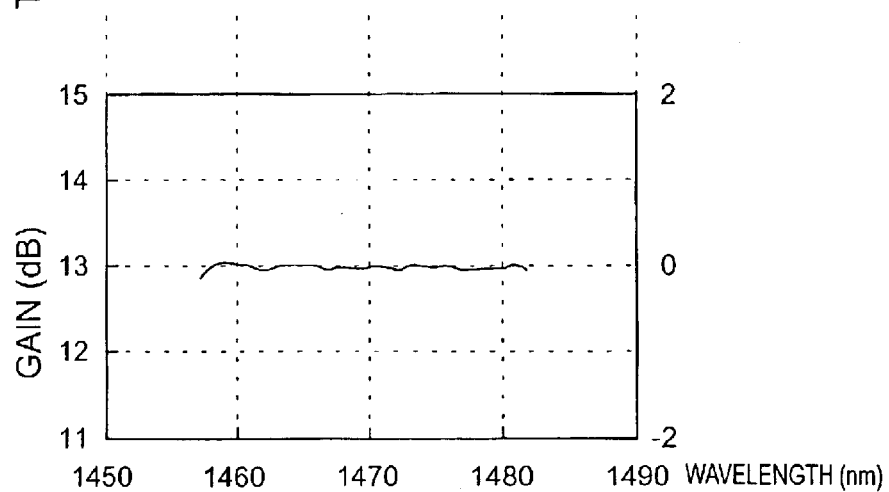
Figure 7A:
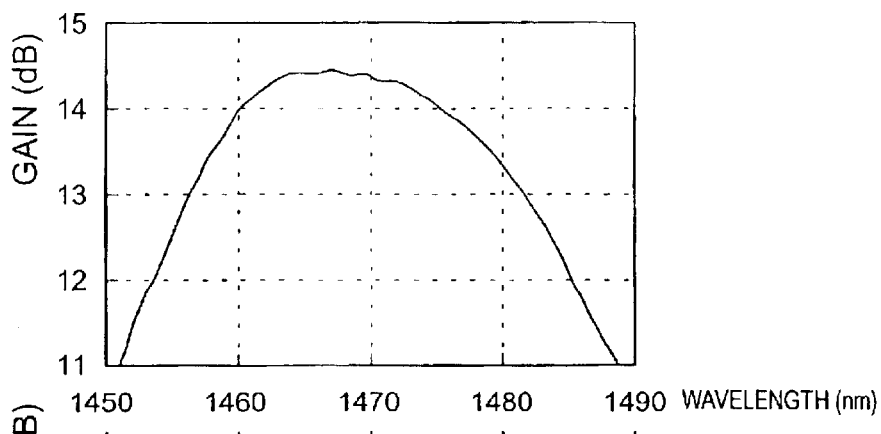
FIG. 7A to 7C show the gain spectrum of an optical amplification fiber at the temperature of 55° C., the transmission spectrum of a long-period grating device as a gain equalizing filter; and the gain spectrum of the entire optical amplifier.
Figure 7B:
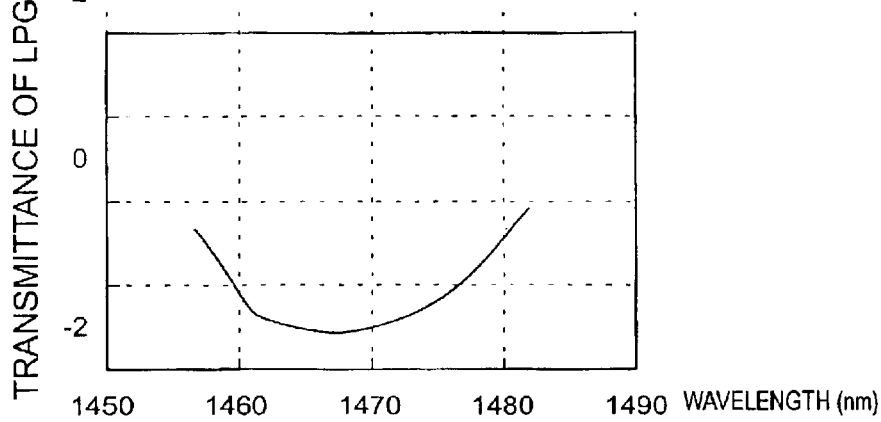
Figure 7C:
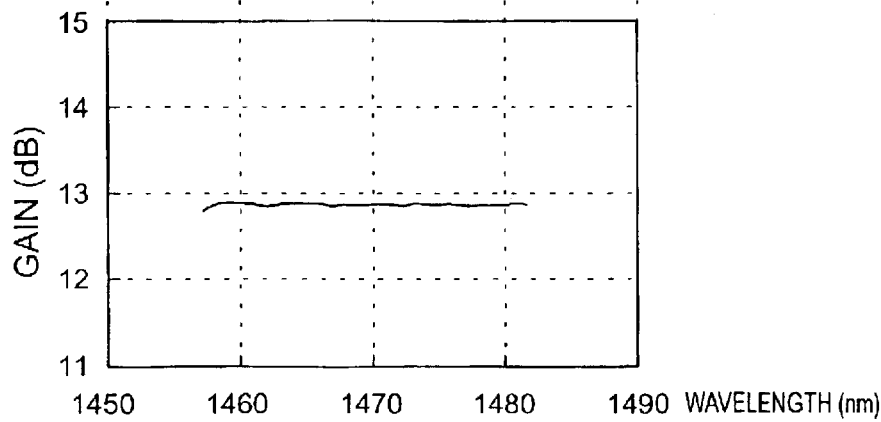

FIGS. 5A to 5C show, at the temperature of 5° C., the gain spectrum of an optical amplification fiber, the transmission spectrum of a long-period grating device (LPG) as a gain equalizing filter, and the gain spectrum of an entire optical amplifier. FIGS. 6A to 6C show, at the temperature of 25° C., the gain spectrum of the optical amplification fiber, the transmission spectrum of the long-period grating device (LPG) as a gain equalizing filter, and the gain spectrum of the entire optical amplifier. Further, FIGS. 7A to 7C show, at the temperature of 55° C., the gain spectrum of the optical amplification fiber, the transmission spectrum of the long-period grating device (LPG) as a gain equalizing filter, and the gain spectrum of the entire optical amplifier. Here, a long-period grating device as a gain equalizing filter 140 is constituted such that a refractive index modulation having a different period is formed in four different regions along the longitudinal direction of an optical fiber in which an appropriate amount of Ge and B are commonly added to its core region, thus having a loss spectrum having the same form as the gain spectrum of the optical amplification fiber. As is seen from FIGS. 5A, 6A and 7A, as the temperature of the optical amplification fiber is higher, the gain spectrum of the optical amplification fiber will shift toward the short wavelength side. As can be understood from FIGS. 5B, 6B and 7B, the loss spectrum of the long-period grating device as a gain equalizing filter shifts toward the short wavelength side by the same shift amount. As a result, the gain spectrum of the entire optical amplifier becomes flat irrespective of the temperature change (see FIGS. 5C, 6C and 7C). The gain deviations of the entire optical amplifier (=Maximum Value–Minimum Value) in the wavelength range of 1455 to 1485 nm were 0.25 dB at the temperature of 5° C., 0.15 dB at the temperature of 25° C., and 0.12 dB at the temperature of 55° C.

FIG. 8 is a view showing a second configuration example of the gain equalizing filter 150. A gain equalizing filter 150B shown in FIG. 8 comprises optical fibers 210, 260, lenses 220, 250, and Fabry-Perot type etalon filters 230, 240. The etalon filter 230 is constituted such that a transparent flat plate 231 and a transparent flat plate 232 which are in parallel with each other are secured by a member 233 made of a material having a predetermined line expansion coefficient. The lens 220 collimates the outgoing light from the end surface of the optical fiber 210 and then guides the collimated light to the etalon filter 230. The lens 250 collects the outgoing light from the etalon filter 240 and then guides the collected light to the optical fiber 260.

In such a gain equalizing filter 150B, the loss spectrum when the outgoing light from the optical fiber 210 enters the optical fiber 260 is obtained by synthesizing the loss spectra of the etalon filters 230 and 240. The loss spectrum of the etalon filter 230 depends on the resonator length between the transparent flat plate 231 and the transparent flat plate 232, and the temperature dependence of the resonator length depends on the line expansion coefficient of the member 233. Also, the loss spectrum of the etalon filter 240 depends on the resonator length between the transparent flat plate 241 and the transparent flat plate 242, and the temperature dependence of the resonator length depends on the line expansion coefficient of the member 243. In general, since the resonator length of the etalon filter is substantially in proportion to a transmission wavelength, when the members 233, 243 having a predetermine line expansion coefficient are employed, the temperature coefficient of wavelength-shifting in the loss spectrum of the gain equalizing filter 150B can be set to a desired value. In this case, the loss spectrum will shift automatically without applying an electrical control to the gain equalizing filter 150B, resulting in reduced power consumption.

For example, the etalon filter 230, at the room temperature, has a resonance length of 25.1 μm and a reflectance of 0.2. Also, the etalon filter 240, at the room temperature, has a resonance length of 49.6 μm and a reflectance of 0.02. The line expansion coefficient of the members 233, 243 is $1.2 \times 10^{-5}$. In this case, the loss spectrum of the gain equalizing filter 150B has a desired configuration, and the temperature coefficient of the wave shift is −0.02 nm/° C.

Incidentally, the gain of the optical amplifier which is required in a practical, a ground optical communication system is about three to four times the gain shown in FIG. 2. Even in such a case, in the wavelength range of 1455 to 1485 nm, the amount of change of gain deviation (=Maximum Value–Minimum Value) per unit temperature change is controlled in about ±0.003 to ±0.004 dB/° C. Assuming that 45° C. considered as a typical operation temperature of an optical amplifier is set to the design center of a gain equalizing filter, the worst case arises at the temperature of 0° C., and then the increase amount of the gain deviation in the optical amplifier becomes about ±0.135 to ±0.180 dB/° C. But, a permissible value of the gain deviation in an optical amplifier which is applied to the land "trunk" based optical communication system is about 1 $dB_{p-p}$, in general. Accordingly, the deterioration of the gain deviation in the optical amplifier 100 falls in a permissible range.

In addition, as shown in FIGS. 5A, 6A, and 7A, as the temperature is higher, the gain spectra of the optical amplification fibers 141, 142 will shift toward the short wavelength side, and the loss spectrum of the gain equalizing filter 150 also shifts toward the short wavelength side by the same shift amount. Thus, the gain spectrum which synthesizes the optical amplification fibers 141, 142 and the gain equalizing filter 150 becomes flat irrespective of the temperature change. However, in a case where only the loss spectrum of the gain equalizing filter 150 is wavelength-shifted, the synthesized gain level in the signal wavelength range changes due to the temperature change. The temperature coefficient is about −0.09 to −0.12 dB/° C.

Thus, the variable optical attenuator 160 controlled by the control circuit 190 provides an attenuation corresponding to the temperature to passing signal light so as to compensate variations of the gain level. With such a configuration, not only the gain spectrum of the entire optical amplifier 100 in a signal wavelength range becomes flat irrespective of the temperature change but also the gain level thereof becomes constant. In this case, the control circuit 190 is dedicated to control only the variable optical attenuator 160 in accordance with the temperature changes of the optical amplification fibers 141, 142 which are measured by the thermometers 171, 172, resulting in its reduced power consumption and easy control.

Here, when a large-scale development of an optical hardware is permitted, the spectrum of the signal light outputted from the optical amplification fiber 142 at the rear-stage is monitored. Based on the monitored results, the gain equalizing filter 150 and variable optical attenuator 160 each maybe controlled by the control circuit 190. Since the case is a feedback control, a stable control is possible.

In the aforementioned description, it is described in a case where, as pumping light, only the light of 1.05 μm wavelength band is supplied from the pumping light sources 131 to 134 to the optical amplification fibers 141, 142. But, in case of an optical amplifier (TDFA) having the optical amplification fibers 141, 142 doped with Tm element, as pumping light, not only the light of 1.05 μm wavelength band but also light in 1.4 μm wavelength band is used, and further the light of 1.55 to 1.65 μm wavelength band is also used. As compared with a case where only the light of 1.05 μm wavelength band is used as pumping light, it is known that when both the light of 1.05 μm wavelength band and the light of 1.55 to 1.65 μm wavelength band is used together as pumping light, the gain spectra of the optical amplification fiber 141, 142 shift toward the long-wavelength side.

Figure 9:
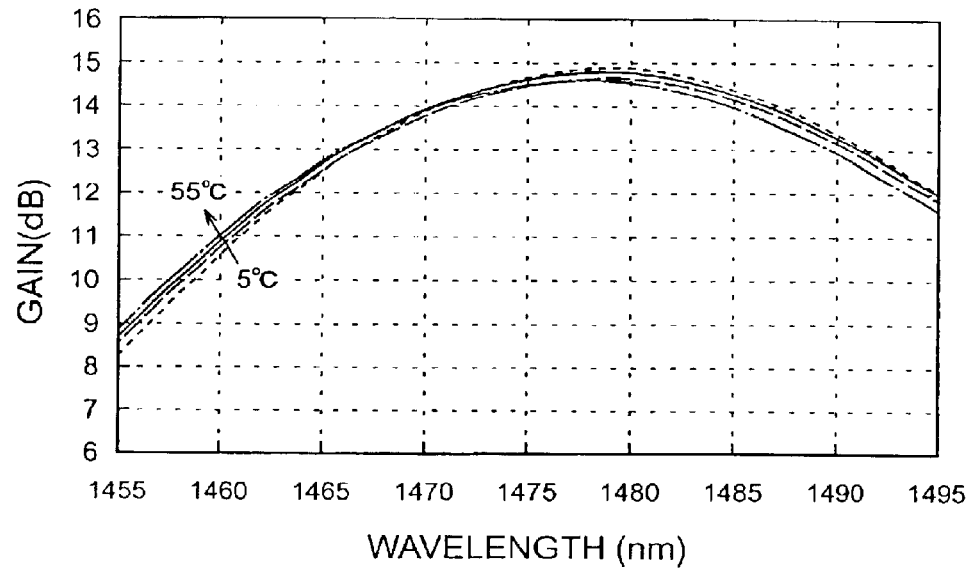
FIG. 9 shows each gain spectrum (pumping by the pumping light of 1.05 μm wavelength band and the pumping light of 1.56 μm wavelength band) at the temperatures of 5° C., 25° C., 45° C. and 55° C. in an optical amplification fiber where Tm element is added to its core region.

FIG. 9 is a view showing the gain spectrum of an optical amplification fiber where Tm element is added to its core region. The gain spectra shown in FIG. 9 are spectra where at the temperature of 5° C., 25° C., 45° C. and 55° C., the pumping light of 1.05 μm wavelength band is fed to an optical amplification fiber having a Tm content of 2000 ppm and having 20 m in length, and further the pumping light of 1.56 μm wavelength band having a power of about 10 mW is also supplied thereto.

As is seen from a comparison of FIG. 2 with FIG. 9, as compared with a case where only the pumping light of 1.05 μm wavelength band is supplied to the optical amplification fiber (FIG. 2), in a case where both of the pumping light of 1.05 μm wavelength band and the pumping light of 1.56 μm wavelength band are supplied thereto (FIG. 9), the gain spectrum of the optical amplification fiber shifts toward the long-period side by about 10 nm.

In addition, as shown in FIG. 9, the gain spectrum of the optical amplification fiber where both of the pumping light of 1.05 μm wavelength band and the pumping light of 1.56 μm wavelength band are supplied thereto is substantially constant even if the temperature changes. But, as the temperature is raised, the gain spectrum will shift toward the short wavelength side. The temperature coefficient of wavelength-shifting in the loss spectrum is about −0.027 nm/° C. Namely, as the temperature is raised by 1° C., the gain spectrum of the optical amplification fiber will shift toward the short-wavelength side by 0.027 nm.

Figure 10:
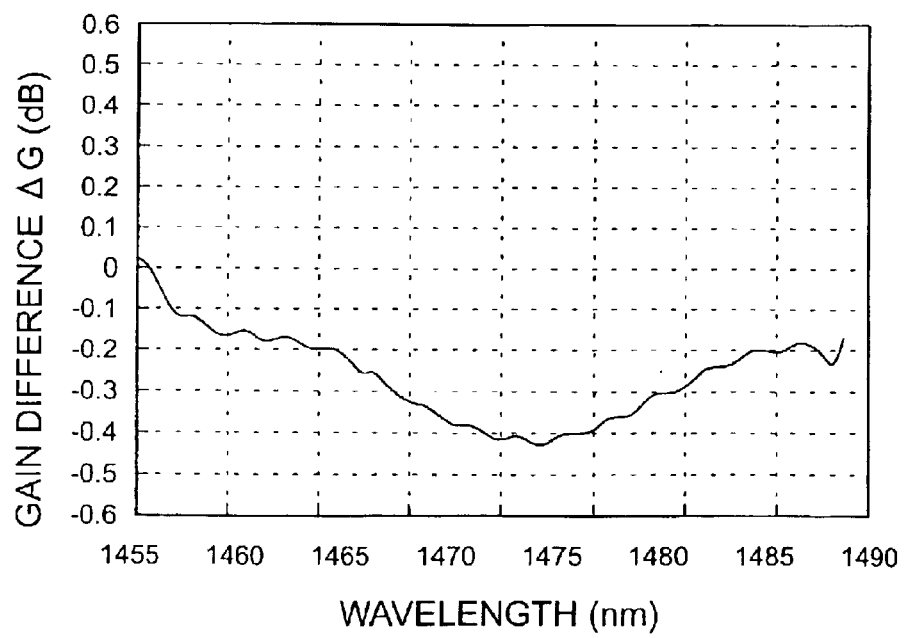
FIG. 10 is a graph showing a gain difference ΔG between the gain spectra shown in FIG. 9.

FIG. 10 is a view showing the gain spectrum difference ΔG of the optical amplification fiber where both of the pumping light of 1.05 μm wavelength band and the pumping light of 1.56 μm wavelength band are supplied thereto. Here, the gain spectrum difference ΔG (λ) is obtained by subtracting the one, which shifts the gain spectrum $G_5$ (λ) at the temperature of 5° C. in FIG. 9 on the short wavelength side by 1.4 nm, from the gain spectrum $G_{55}$ (λ) at the temperature of 55° C. in FIG. 9. It is represented by the following expression (1):

$$\Delta G(\lambda) = G_{55}(\lambda) - G_5(\lambda + 1.4 \text{ nm}) \quad (2)$$

where λ is the wavelength.

As shown in the graph, in the wavelength range of 1462 to 1492 nm, the maximum value of absolute value of the gain spectrum difference ΔG(λ) is about 0.43 dB. The change amount of gain deviation per unit temperature change is controlled in about ±0.002 dB/° C. Thus, the gain spectrum $G_{55}$ (λ) at the temperature of 55° C., and $G_5$ (λ+1.4 nm) obtained by shifting the gain spectrum $G_5$ (λ) at the temperature of 5° C. toward the short wavelength side by 1.4 nm almost conforms with each other. That is, when the temperature of the optical amplification fiber is raised by 50° C., the gain spectrum of the optical amplification fiber is shifted by 1.4 nm toward the short wavelength side. Thus, the temperature coefficient of wavelength-shifting in the loss spectrum of the optical amplification fiber is −0.027 nm/° C. (=−1.4 nm/50° C.).

Therefore, in the optical amplifier 100 shown in FIG. 1A, when both of the pumping light of 1.05 μm wavelength band and the pumping light of 1.55 to 1.65 μm wavelength band are supplied to the optical amplification fibers 141, 142 from the pumping light sources 131 to 134 as described above, the temperature coefficient of wavelength-shifting in the loss spectrum of the gain equalizing filter 150 is preferably set to about −0.027 nm/° C. That is, when the temperature is changed by ΔT (°C.), the gain spectra of the optical amplification fibers 141, 142 are wavelength-shifted by −0.027·ΔT (nm), and the loss spectrum of the gain equalizing filter 150 is also wavelength-shifted by −0.027·ΔT (nm). Accordingly, the gain spectrum of the entire optical amplifier 100 becomes flat irrespective of the temperature.

The gain equalizing filter 150 having such a characteristic can be achieved by the same manner as the aforementioned one. Also, such that a long-period grating device formed on a normal silica-based optical fiber is mounted to a flexible tube and so on is available for the gain equalizing filter 150.

Here, what the temperature coefficient of wavelength-shifting in the loss spectrum of the aforementioned optical amplification fiber is −0.027 nm/° C. corresponds to a case where the pumping light of 1.56 μm wavelength band having about 10 mW is supplied thereto. In a case where the pumping light of 1.55 to 1.65 μm wavelength band is supplied thereto in addition to the pumping light of 1.05 μm wavelength band, the shift amount of the gain spectra of the optical amplification fibers 141, 142 toward the long-wavelength side can be adjusted by the power of the pumping light of 1.55 to 1.65 μm wavelength band which is supplied to the optical amplification fibers 141, 142. Therefore, it is required that the temperature coefficient of wavelength-shifting in the loss spectrum of the gain equalizing filter 150 is appropriately set according to the power of the pumping light of the pumping light of 1.55 to 1.65 μm wavelength band, which is fed to the optical amplification fibers 141, 142.

Figure 11:
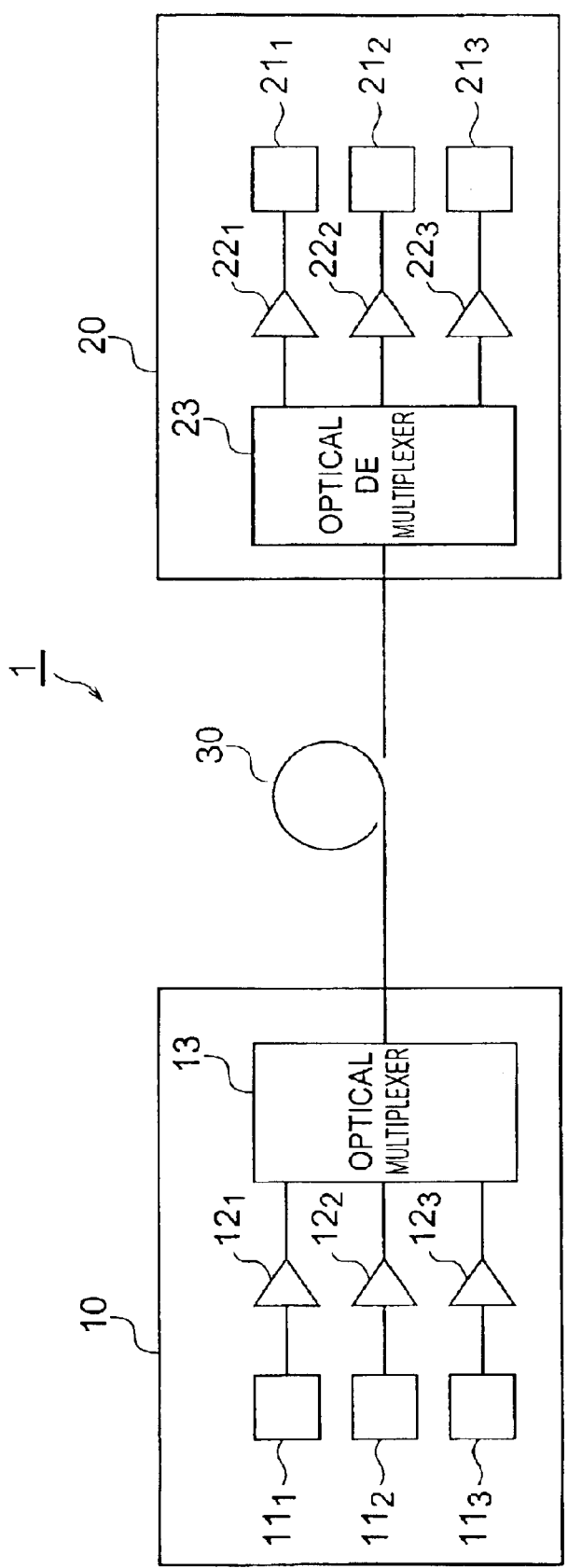
FIG. 11 is a view showing a configuration of one embodiment in an optical communication system 1 according to the present invention.

FIG. 11 is a view of a configuration of an embodiment in an optical communication system according to with the present invention. The optical communication system 1 comprises an optical transmitter 10, an optical receiver 20, and an optical fiber transmission line 30 laid between these optical transmitter 10 and optical receiver 20.

Light source units $11_1$ to $11_3$, optical amplifiers $12_1$ to $12_3$ and optical multiplexer 13 are provided in the optical transmitter 10. The light source unit $11_1$ generates signal light having a plurality of channels in the S band, and combines and outputs the signal light. The light source unit $11_2$ generates signal light having a plurality of channels in the C band, and combines and outputs the signal light. The light source unit $11_3$ generates signal light having a plurality of channels in the L band and, and combines and outputs the signal light.

The optical amplifier $12_1$ batch-amplifies the signal light of the S band outputted from the light source unit $11_1$. The optical amplifier $12_2$ batch-amplifies the signal light of the C band outputted from the light source unit $11_2$. The optical amplifier $12_3$ batch-amplifies the signal light of the L band outputted from the light source unit $11_3$. In addition, the optical multiplexer 13 combines the signal light of the S band outputted from the optical amplifier $12_1$, the signal light of the C band outputted from the optical amplifier $12_2$, and the signal light of the L band outputted from the optical amplifier $12_3$ to transmits the resultant to the optical fiber transmission line 30.

Light receiving units $21_1$ to $21_3$, optical amplifiers $22_1$ to $22_3$, and an optical amplifier 23 are provided in the optical receiver 20. An optical demuitiplexer 23 divides the signal light, which propagates through the optical fiber transmission line 30, for each of the S, C, and L bands. The optical amplifier $22_1$ batch-amplifies the signal light of the S band outputted from the optical demultiplexer 23. The optical amplifier $22_2$ batch-amplifies the signal light of the C band outputted from the optical demultiplexer 23. The optical amplifier $22_3$ batch-amplifies the signal light of the L band outputted from the optical demultiplexer 23. The light receiving unit $21_1$ receives the signal light of the S band outputted from the optical amplifier $22_1$ for each signal channel. The light receiving unit $21_2$ receives the signal light of the C band outputted from the optical amplifier $22_2$ for each signal channel. The light receiving unit $21_3$ receives the signal light of the L band outputted from the optical amplifier $22_3$ for each signal channel.

The optical amplifiers $12_1$, $22_1$ for the S band each have the same configuration (TDFA) as the aforementioned optical amplifier 100 among six optical amplifiers shown in FIG. 11. Incidentally, the optical amplifiers $12_2$, $22_2$ for the C band and the optical amplifiers $12_3$, $22_3$ for the L band each are EDFA which supplies the pumping light of 0.98 μm wavelength band or 1.48 μm wavelength band to an EDF so as to amplify the signal light.

The optical communication system 1 operates as follows. In the optical transmitter 10, the signal light of the S band outputted from the light source unit $11_1$ is amplified by the optical amplifier $12_1$, the signal light of the C band outputted from the light source unit $11_2$ is amplified by the optical amplifier $12_2$, and the signal light of the L band outputted from the light source unit $11_3$ is amplified by the optical amplifier $12_3$. The amplified signal lights of the S, C, and L bands in each band are combined by the optical multiplexer 13 to be transmitted to the optical fiber transmission line 30.

In the optical receiver 20, the signal light of the S, C, and L bands in each band propagating the optical fiber transmission line 30 is divided for each band through an optical demultiplexer 23. The signal light of the S band divided by the optical demultiplexer 23 is amplified by the optical amplifier $22_1$ and then is received for each channel by the light receiving unit $21_1$. The signal light of the C band divided by the optical demultiplexer 23 is amplified by the optical amplifier $22_2$ and then is received for each channel by the light receiving unit $21_2$. The signal light of the L band divided by the optical demultiplexer 23 is amplified by the optical amplifier $22_3$ and then is received for each channel by the light receiving unit $21_3$.

In such a way, since the optical communication system 1 transmits the multiplexed signal of the S, C and L bands in each band through the optical fiber transmission line 30, it can transmit large-capacity information at high speed. Additionally, the optical amplifiers $12_1$, $22_1$ each have the same configuration (TDFA) as the aforementioned optical amplifier 100, resulting in reduced power consumption, and thereby reducing temperature dependence of gain with simple control. Therefore, the optical communication system 1 guarantees an excellent transmission quality to the S-band signal light.

As described above, in accordance with the present invention, pumping light is supplied to an optical waveguide where Tm element is added to its optical waveguide region by a pumping light supply system. When signal light in a predetermined wavelength range enters the optical waveguide, the signal light will be amplified in the optical waveguide. The loss spectrum of the gain equalizing filter which is optically connected to the optical waveguide has almost the same form as the gain spectrum of the optical waveguide, and the amplification gain of the signal light in the optical waveguide is equalized through a gain equalizing filter, whereby the gain spectrum of the entire optical amplifier will be flattened within a predetermined wavelength range. The gain spectrum of the optical waveguide doped with Tm element shifts toward the short wavelength side as the temperature of the optical waveguide is higher. In addition, the gain equalizing filter has a loss spectrum which shifts toward the short wavelength side as the temperature is higher. Therefore, in a predetermined wavelength range, temperature dependence of the gain in the entire optical amplifier will be reduced. In such a way, the optical amplifier enables to reduce its power consumption and temperature dependence of the gain with simple control.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical amplifier comprising:
   an optical waveguide including an optical waveguide region doped with Tm element;
   a pumping light supply system for supplying pumping light to said optical waveguide; and
   a gain equalizing filter, optically connected to said optical waveguide, for equalizing an optical amplification gain of signal light propagating through said optical waveguide, said gain equalizing filter having a loss spectrum which shifts toward a short wavelength side as a temperature of said optical waveguide is higher.

2. An optical amplifier according to claim 1, wherein said optical amplifier amplifies signal light within the wavelength range of 1455 to 1485 nm.

3. An optical amplifier comprising:
   an optical waveguide including an optical waveguide region doped with Tm element;
   a pumping light supply system for supplying pumping light to said optical waveguide; and
   a gain equalizing filter, optically connected to said optical waveguide, for equalizing an optical amplification gain of signal light propagating through said optical waveguide, said gain equalizing filter having a loss spectrum which shifts toward a short wavelength side as a temperature of said optical wave guide is higher,
   wherein said pumping light supply system supplies light of 1.05 μm wavelength band only as said pumping light to said optical waveguide, and a temperature coefficient of wavelength-shifting in said loss spectrum of said gain equalizing filter is −0.02 nm/° C.

4. An optical amplifier comprising:
   an optical waveguide including an optical waveguide region doped with Tm element;
   a pumping light supply system for supplying pumping light to said optical waveguide; and
   a gain equalizing filter, optically connected to said optical waveguide, for equalizing an optical amplification gain of signal light propagating through said optical waveguide, said gain equalizing filter having a loss spectrum which shifts toward a short wavelength side as a temperature of said optical waveguide is higher,
   wherein said pumping light supply system supplies light of 1.05 μm wavelength band and 1.55 to 1.65 μm wavelength band as said pumping light to said optical waveguide, and a temperature coefficient of wavelength-shifting in said loss spectrum of said gain equalizing filter is less than −0.02 nm/° C.

5. An optical amplifier according to claim 1, further comprising a control circuit for controlling said gain equalizing filter such that said loss spectrum of said gain equalizing filter shifts similar to a wavelength shift of a gain characteristic of said optical waveguide.

6. An optical amplifier according to claim 1, wherein, in the same temperature environment where said optical waveguide is disposed, said gain equalizing filter has a temperature dependence such that said loss spectrum shifts in accordance with a temperature change of said optical waveguide.

7. An optical amplifier according to claim 1, further comprising a variable optical attenuator which is optically connected to said optical waveguide, wherein an attenuation of said variable optical attenuator against said signal light is adjusted in accordance with a temperature change of said optical waveguide.

8. An optical communication system including the optical amplifier according to claim 1, wherein said optical communication system transmits signal light of a plurality of channels having different wavelengths from each other, and said signal light is amplified by said optical amplifier.

9. An optical amplifier according to claim 5, further comprising a variable optical attenuator which is optically connected to said optical waveguide, wherein an attenuation of said variable optical attenuator against said signal light is adjusted in accordance with a temperature change of said optical waveguide.

10. An optical amplifier according to claim 6, further comprising a variable optical attenuator which is optically connected to said optical waveguide, wherein an attenuation of said variable optical attenuator against said signal light is adjusted in accordance with a temperature change of said optical waveguide.

11. An optical communication system including the optical amplifier according to claim 2, wherein said optical communication system transmits signal light of a plurality of channels having different wavelengths from each other, and said signal light is amplified by said optical amplifier.

12. An optical communication system including the optical amplifier according to claim 3, wherein said optical communication system transmits signal light of a plurality of channels having different wavelengths from each other, and said signal light is amplified by said optical amplifier.

13. An optical communication system including the optical amplifier according to claim 4, wherein said optical communication system transmits signal light of a plurality of channels having different wavelengths from each other, and said signal light is amplified by said optical amplifier.

14. An optical communication system including the optical amplifier according to claim 5, wherein said optical communication system transmits signal light of a plurality of channels having different wavelengths from each other, and said signal light is amplified by said optical amplifier.

15. An optical communication system including the optical amplifier according to claim 6, wherein said optical communication system transmits signal light of a plurality of channels having different wavelengths from each other, and said signal light is amplified by said optical amplifier.

16. An optical communication system including the optical amplifier according to claim 7, wherein said optical communication system transmits signal light of a plurality of channels having different wavelengths from each other, and said signal light is amplified by said optical amplifier.

* * * * *